United States Patent
Zhang et al.

(10) Patent No.: US 12,181,761 B2
(45) Date of Patent: Dec. 31, 2024

(54) DISPLAY SUBSTRATE AND DISPLAY PANEL FOR REDUCING CROSSTALK

(71) Applicants: Hefei BOE Display Technology Co., Ltd., Anhui (CN); BOE TECHNOLOGY GROUP CO., LTD., Beijing (CN)

(72) Inventors: Yuntian Zhang, Beijing (CN); Maoxiu Zhou, Beijing (CN); Haipeng Yang, Beijing (CN); Ke Dai, Beijing (CN); Mengmeng Li, Beijing (CN); Yanping Liao, Beijing (CN); Lei Guo, Beijing (CN)

(73) Assignees: Hefei BOE Display Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 357 days.

(21) Appl. No.: 17/773,412

(22) PCT Filed: Jul. 7, 2021

(86) PCT No.: PCT/CN2021/104954
§ 371 (c)(1),
(2) Date: Apr. 29, 2022

(87) PCT Pub. No.: WO2022/042061
PCT Pub. Date: Mar. 3, 2022

(65) Prior Publication Data
US 2022/0382115 A1    Dec. 1, 2022

(30) Foreign Application Priority Data
Aug. 27, 2020    (CN) .......................... 202010878350.3

(51) Int. Cl.
G02F 1/1362    (2006.01)
G02F 1/1343    (2006.01)
G02F 1/1368    (2006.01)

(52) U.S. Cl.
CPC .. *G02F 1/136286* (2013.01); *G02F 1/134309* (2013.01); *G02F 1/1368* (2013.01)

(58) Field of Classification Search
CPC ......... G02F 1/136286; G02F 1/134309; G02F 1/1368
See application file for complete search history.

(56) References Cited

U.S. PATENT DOCUMENTS

| 2012/0252125 A1 | 10/2012 | Puntambekar |
| 2016/0147119 A1 | 5/2016 | Chang et al. |
| 2019/0228711 A1 | 7/2019 | Murai et al. |

FOREIGN PATENT DOCUMENTS

| CN | 101527306 A | 9/2009 |
| CN | 102385200 A | 3/2012 |

(Continued)

OTHER PUBLICATIONS

China Patent Office, CN202010878350.3 First Office Action issued on Jul. 8, 2022.

*Primary Examiner* — Joseph L Williams
(74) *Attorney, Agent, or Firm* — HOUTTEMAN LAW LLC

(57) ABSTRACT

An Embodiment of the present disclosure provide a display substrate, including a base substrate, and a plurality of first scanning lines, a plurality of second scanning lines, a plurality of data lines, a plurality of common electrodes and a plurality of pixel electrodes on the base substrate. The second scanning lines are parallel to the data lines, and the second scanning lines, the common electrodes and the pixel electrodes are in different layers. The common electrodes are located on a side of the second scanning lines and the data (Continued)

lines away from the base substrate, and on a side of the pixel electrodes proximal to the base substrate. An orthographic projection of one of the data line and the second scanning line on the base substrate is located in a spacer region between adjacent pixel electrodes.

16 Claims, 7 Drawing Sheets

(56) References Cited

FOREIGN PATENT DOCUMENTS

| | | |
|---|---|---|
| CN | 102566168 A | 7/2012 |
| CN | 102629053 A | 8/2012 |
| CN | 102645808 A | 8/2012 |
| CN | 102938394 A | 2/2013 |
| CN | 103852944 A | 6/2014 |
| CN | 103869564 A | 6/2014 |
| CN | 104049429 A | 9/2014 |
| CN | 104246593 A | 12/2014 |
| CN | 105446032 A | 3/2016 |
| CN | 106200176 A | 12/2016 |
| CN | 106647073 A | 5/2017 |
| CN | 109240017 A | 1/2019 |
| CN | 109634012 A | 4/2019 |
| CN | 109782502 A | 5/2019 |
| KR | 20140078266 A | 6/2014 |
| WO | WO 2015132819 A1 | 9/2015 |

DISPLAY SUBSTRATE AND DISPLAY PANEL FOR REDUCING CROSSTALK

TECHNICAL FIELD

Embodiments of the present disclosure relates to the field of display technology, and in particularly, to a display substrate and a display panel.

BACKGROUND

With the increasingly tense market competition in the field of liquid crystal displays (LCDs), the market of high-end display screens has become the main field of competition in the future. The ultra-narrow bezel screen or full screen belongs to the high-end quality display screens. Due to the lack of a full screen with stable mass production in the market, various screen factories are focusing on development in this aspect.

SUMMARY

Embodiments of the present disclosure provide a display substrate and a display panel.

As a first aspect, a display substrate is provided in an embodiment of the preset disclosure. The display substrate includes a base substrate, and a plurality of first scanning lines, a plurality of second scanning lines, a plurality of data lines, a plurality of common electrodes and a plurality of pixel electrodes on the base substrate. The second scanning line is parallel to the data line, and the second scanning line, the common electrode and the pixel electrode are in different layers; and the common electrode is located on a side of the second scanning line and the data line away from the base substrate, and on a side of the pixel electrode proximal to the base substrate. An orthographic projection of one of the data line and the second scanning line on the base substrate is located in a spacer region between adjacent pixel electrodes, and an orthographic projection of the other of the data line and the second scanning line on the base substrate overlaps an orthographic projection of the pixel electrode on the base substrate.

Optionally, the orthographic projection of the data line on the base substrate is located on a center line of the orthographic projection of the pixel electrode on the base substrate, and the orthographic projection of the second scanning line on the base substrate is located in the spacer region between the adjacent pixel electrodes; or the orthographic projection of the data line on the base substrate is located in the spacer region between the adjacent pixel electrodes, and the orthographic projection of the common electrode lines on the base substrate is located on a center line of the orthographic projection of the pixel electrode on the base substrate.

Optionally, the second scanning line is disposed in the same layer as the data line; the first scanning line is disposed on a side of the second scanning line proximal to the base substrate, a first insulation layer is provided between the second scanning line and the first scanning line, and the second scanning line is connected to the first scanning lines through a via formed in the first insulation layer to provide an input signal for the first scanning line; the common electrode and the pixel electrode are disposed on a side of the second scanning line away from the base substrate, and the common electrode and the pixel electrode are sequentially arranged away from the base substrate and correspond to each other; a second insulation layer is provided between the common electrode and the second scanning line; and a third insulation layer is provided between the common electrode and the pixel electrode.

Optionally, the pixel electrodes are arranged in an array, the first scanning lines extend in a row direction of the array, and a spacer region between any two adjacent rows of the pixel electrodes is provided with one of the first scanning lines; and the second scanning line and the data line extend in a column direction of the array.

Optionally, one of the data line and the second scanning line with the orthographic projection thereof on the base substrate overlapping the orthographic projection of the pixel electrode on the base substrate has a width greater than a width of the other of the data line and the second scanning line with the orthographic projection thereof on the base substrate located in the spacer region between the adjacent pixel electrodes.

Optionally, the second scanning line has the same thickness as the data line; and the second insulation layer comprises a first sub-layer with a thickness greater than a thickness of the data line, and a thickness ratio of the first sub-layer to the data line ranges from 3:1 to 9:1.

Optionally, the second insulation layer further includes a second sub-layer, the second sub-layer and the first sub-layer being stacked sequentially away from the base substrate; and the first sub-layer has a thickness greater than a thickness of the second sub-layer, and a thickness ratio of the second sub-layer to the first sub-layer ranges from 1:25 to 1:10.

Optionally, a number of the second scanning lines is smaller than a number of the data lines. The display substrate further includes a plurality of common electrode lines on the base substrate, wherein the plurality of common electrode lines and the plurality of second scanning lines are disposed in a same layer and parallel to each other. When the orthographic projections of the plurality of data lines on the base substrate overlap the orthographic projections of the plurality of pixel electrodes on the base substrate, an orthographic projections of the plurality of common electrode lines on the base substrate are respectively located in spacer regions between a part of adjacent pixel electrodes, and no second scanning line is provided in the spacer regions between the part of adjacent pixel electrodes. When the orthographic projections of the plurality of data lines on the base substrate are respectively located in spacer regions between adjacent pixel electrodes, the orthographic projections of the plurality of common electrode lines on the base substrate overlap the orthographic projections of a part of adjacent pixel electrodes on the base substrate, and the orthographic projections of the part of adjacent pixel electrodes on the base substrate do not overlap the orthographic projections of the plurality of second scanning lines on the base substrate.

Optionally, the plurality of second scanning lines and the plurality of common electrode lines are alternately arranged along an arrangement direction of the plurality data lines, and any two adjacent second scanning line and the common electrode line has a same distance therebetween.

Optionally, the display substrate further includes a plurality of switch transistors each comprising a gate electrode, the first insulation layer, an active layer, a source electrode and a drain electrode; wherein the gate electrode is disposed in the same layer as the first scanning lines, the first insulation layer and the active layer are sequentially stacked on a side of the gate electrode away from the base substrate, the source electrode and the drain electrode are disposed in the same layer as the data line and on a side of the active layer away from the base substrate, and the source electrode and the drain electrode are disposed at two opposite sides of the active layer respectively and connected to the active layer. The drain electrodes of the switch transistors are respectively connected to corresponding pixel electrodes; the source electrodes of the switch transistors are respectively connected to corresponding data lines; and gate electrodes of the switch transistors corresponding to rows of the pixel electrodes are respectively connected to corresponding first scanning lines. Among columns of pixel electrodes, the source electrodes of the switch transistors corresponding to odd-numbered columns of pixel electrodes are correspondingly connected to one data line, the source electrodes of the switch transistors corresponding to even-numbered columns of pixel electrodes are correspondingly connected to another data line, with the one data line being adjacent to the another data line.

Optionally, the switch transistors connected to a same data line are respectively disposed at two sides or a same side of the data line, and disposed proximal to the data line.

Optionally, the number of the second scanning lines is n times the number of the first scanning lines, where n is an integer, and n=1, 2, 3 . . . .

Optionally, adjacent second scanning lines has a same distance therebetween, and points at connection positons where the second scanning lines are respectively connected to the first scanning lines are arranged to form a straight line or a polygonal line.

As a second aspect, a display panel is provided in embodiment of the present disclosure. The display panel includes the display substrate describe above and an counter substrate opposite to the display substrate and facing the pixel electrodes in the display substrate; wherein liquid crystals are filled in a gap formed by aligning the counter substrate and the display substrate for forming a cell.

BRIEF DESCRIPTION OF DRAWINGS

Accompanying drawings are provided for further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art through detailed description of the exemplary embodiments with reference to the accompanying drawings, in which.

Figure 1:
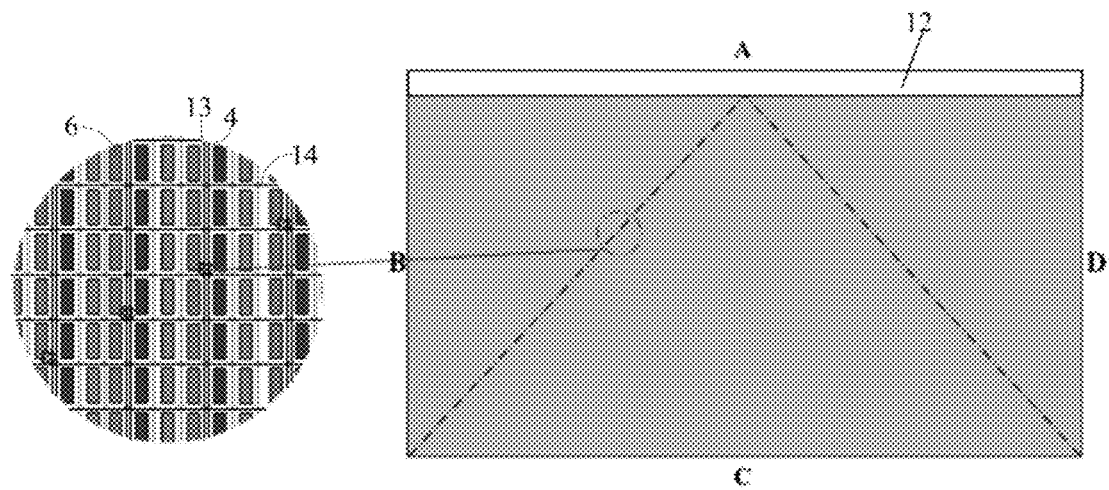
FIG. 1 is a schematic top view showing an arrangement of a GOA driving circuit in an ultra-narrow bezel or full screen according to the existing art.

The reference signs therein are listed below:

1. base substrate; 2. first scanning line; 3. second scanning line; 4. data line; 5. common electrode; 6. pixel electrode; 7. first insulation layer; 8. second insulation layer; 81. first sub-layer; 82. second sub-layer; 9. third insulation layer; 10. switch transistor; 101. gate electrode; 102. source electrode; 103. drain electrode; 11. common electrode line; 12. GOA driving circuit; 13. vertical scanning line; and 14. horizontal scanning line.

DETAIL DESCRIPTION OF EMBODIMENTS

In order to make those skilled in the art better understand the technical solutions in the embodiments of the present disclosure, the display substrate and the display panel provided in the embodiments of the present disclosure will be described in further detail below with reference to the accompanying drawings and specific implementations.

Embodiments of the present disclosure will be described more sufficiently below with reference to the accompanying drawings, but which may be embodied in different forms and should not be construed as limited to the embodiments set forth in the present disclosure. Rather, these embodiments are provided so that this disclosure will be thorough and complete, and will fully convey the scope of the present disclosure to those skilled in the art.

The embodiments of the present disclosure are not limited to the embodiments shown in the drawings, but further include modifications of configurations formed based on a manufacturing process. Thus, the regions illustrated in the figures have schematic properties, and the shapes of the regions shown in the figures illustrate specific shapes of regions, but are not intended to be limitative.

Figure 2:
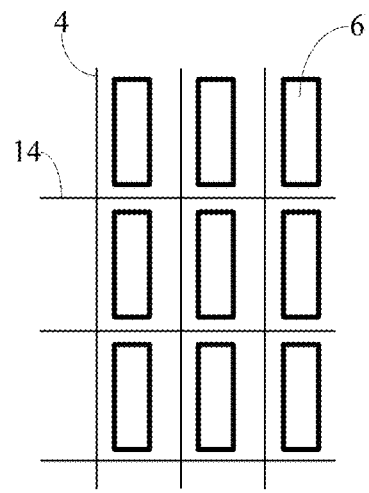
FIG. 2 is a schematic top view showing arrangement of a pixel structure in a non-full display screen according to the existing art.
Figure 3:
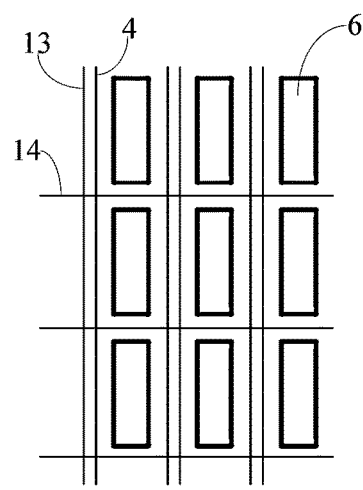
FIG. 3 is a schematic top view showing a pixel structure in a full screen according to the existing art.

The ultra-narrow bezel technology is developing boomingly, bringing huge impact to the visual experience of consumers, as well as more choices in the field of splicing display. In conventional panel products, Gate On Array (hereafter, referred to as a GOA driving circuit for short) for transistors are typically located on left and right sides (i.e., sides B and D) of a display panel, thereby an ultra-narrow bezel or full screen product cannot be realized. According to current design schemes of the ultra-narrow bezel or full screen technology, the GOA driving circuit 12 originally disposed on the left and right sides of the display panel is moved to side A of the display panel (i.e., the upper side of the display panel), as shown in FIG. 1, i.e., scanning signal input terminals are moved from the left and right sides of the display panel to a data signal input side, so that the bezels on the left and right sides of the display panel are smaller, for example less than 1 mm. However, such an arrangement brings a problem particular to the ultra-narrow bezel or full screen. There are two types of scanning lines, i.e., scanning lines parallel to a longer side of the display panel (i.e., a row of a pixel array) and scanning lines perpendicular to a longer side of the display panel (i.e., a column of the pixel array). The scanning lines parallel to the longer side of the display panel are transistor control lines, and the scanning lines perpendicular to the longer side of the display panel are scanning signal input lines. The vertical scanning line to the horizontal scanning line, so that the scanning signal is transmitted to the horizontal scanning line to drive rows of the pixel array, thereby realizing an ultra-narrow bezel or no bezel at the left, right and lower sides of the display panel. As shown in FIGS. 2 and 3, the vertical scanning lines 13 and the data lines 4 are both disposed in spacer regions between two adjacent columns of pixel electrodes 6 (i.e., the region covered by a black matrix), so that scanning signal on the vertical scanning line 13 can significantly pull a pixel voltage, and the pixel voltage at connection positions between the horizontal scanning line 14 and the vertical scanning line 13 is different from the pixel voltage at other position, which may cause a poor display image particular to an ultra-narrow bezel or full screen, that is, the "V" shaped display abnormality (i.e., "V" shaped Mura) shown in FIG. 1. That is, each horizontal scanning line 14 of the full screen is driven bilaterally or driven doubly. The "V" shape is a polygonal line formed by the arrangement of points of connection locations where the horizontal scanning lines 14 are connected to the vertical scanning lines 13. Meanwhile, the scanning signals on the vertical scanning lines 13 may also pull the data signals on the data lines 4, so that the data lines 4 on the left and right sides of the pixel electrode 6 pull the pixel voltage asymmetrically, resulting defects such as specific crosstalk.

Figure 4:
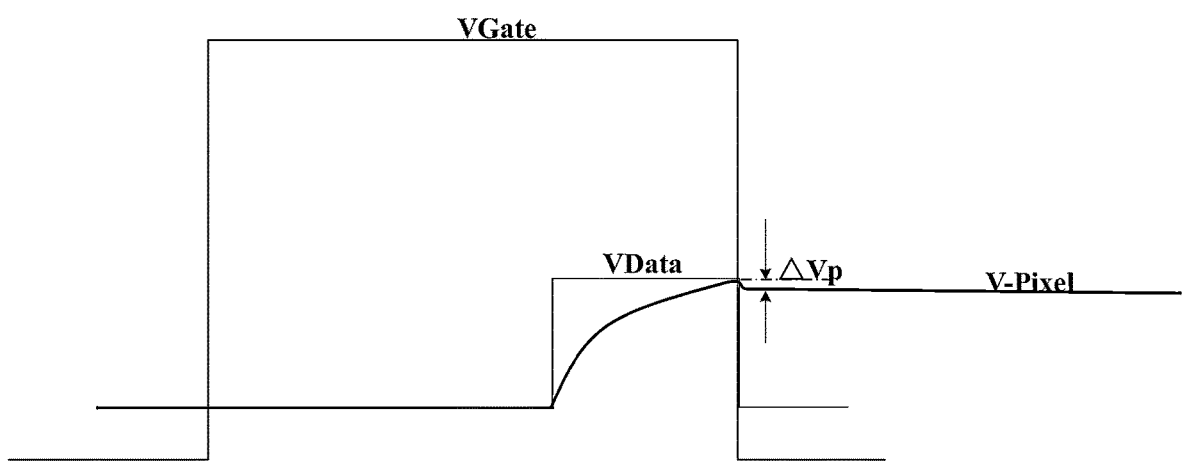
FIG. 4 is a schematic diagram showing pulling effects of a gate drive signal of a vertical scanning line on a data signal voltage and a pixel voltage in a full screen according to the existing art.

As shown in FIG. 4, in a full screen having the above pixel structure, at the end of charging a pixel voltage V-pixel and at the moment a gate drive signal VGate jumps, a downward pull value exist between the data signal voltage VData and the pixel voltage V-pixel under an action of parasitic capacitances Cgd and Cgp; for example, a voltage loss $\Delta$ Vp, $\Delta$Vp=Cgp/(Cdp+Cgp+Cst)*$\Delta$Vgate of the pixel voltage generates; where Cdp is a parasitic capacitance between the pixel electrode 6 and the data line 4, Cgp is a parasitic capacitance between the pixel electrode 6 and the vertical scanning line 13, and Cst is a storage capacitance between the pixel electrode 6 and the common electrode 5; and $\Delta$Vgate is a signal jump on the vertical scanning line 13. The pulling, by the jump of the gate drive signal VGate, the pixel voltage V-pixel is implemented at the moment when charging of the pixel electrode 6 is finished. Therefore, pixels at connection positions of the vertical scanning lines 13 and the horizontal scanning lines 14 may display differently from pixels at other positions, which will eventually result in a whole screen presenting the "V" shaped abnormal display (i.e., "V" shaped Mura) as shown in FIG. 1 macroscopically.

Figure 5:
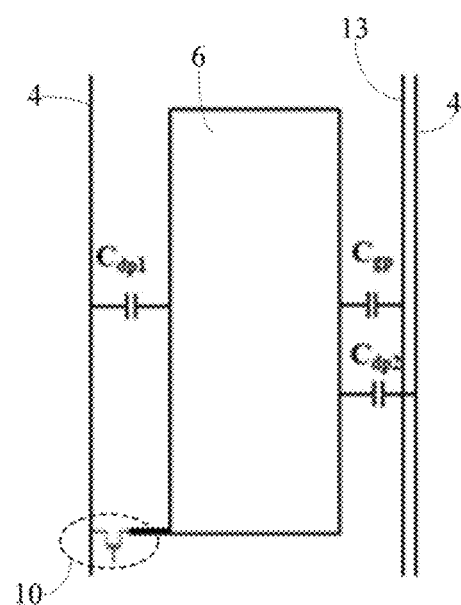
FIG. 5 is a schematic diagram showing parasitic a capacitance between a pixel electrode and a data line and a capacitance between the pixel electrode and a vertical scanning line in a full screen according to the existing art.

As shown in FIG. 5, in general, the data lines 4 are provided at the left and right sides of a pixel electrode 6, respectively, and the parasitic capacitors Cdp1 and Cdp2 between the pixel electrode 6 and the two data lines 4 are different under an influence of the switch transistor 10 and shielding of the vertical scanning line 13. As a result, the crosstalk degrees of the left and right data lines 4 on the pixel electrode 6 may differ from each other by a difference $\Delta$Vd, where $$\Delta V_d = \left\| \frac{Cdp1}{Cdp1 + Cgp + Cst} * \Delta Vdata1 \right| - \left| \frac{Cdp2}{Cdp2 + Cgp + Cst} * \Delta Vdata2 \right\|;$$

where Cdp1 is a parasitic capacitance between the pixel electrode 6 and the data line 4 on the left, Cdp2 is a parasitic capacitance between the pixel electrode 6 and the data line 4 on the right, Cgp is a parasitic capacitance between the pixel electrode 6 and the vertical scanning line 13, and Cst is a storage capacitance between the pixel electrode 6 and the common electrode 5; $\Delta$Vdata1 is a change of the signal on the data line 4 on the left; and $\Delta$Vdata2 is a change of the signal on the data line 4 on the right. The data lines 4 on the left and right sides of the pixel electrode 6 pull the pixel voltage asymmetrically, so that defects such as specific crosstalk exist, thereby severely affecting the display effect of the full screen.

Aiming at the problems of abnormal display such as specific crosstalk and the like in the full screen of the above pixel structure, embodiments of the present disclosure provide a display substrate and a manufacture method thereof, and a display panel.

Figure 6:
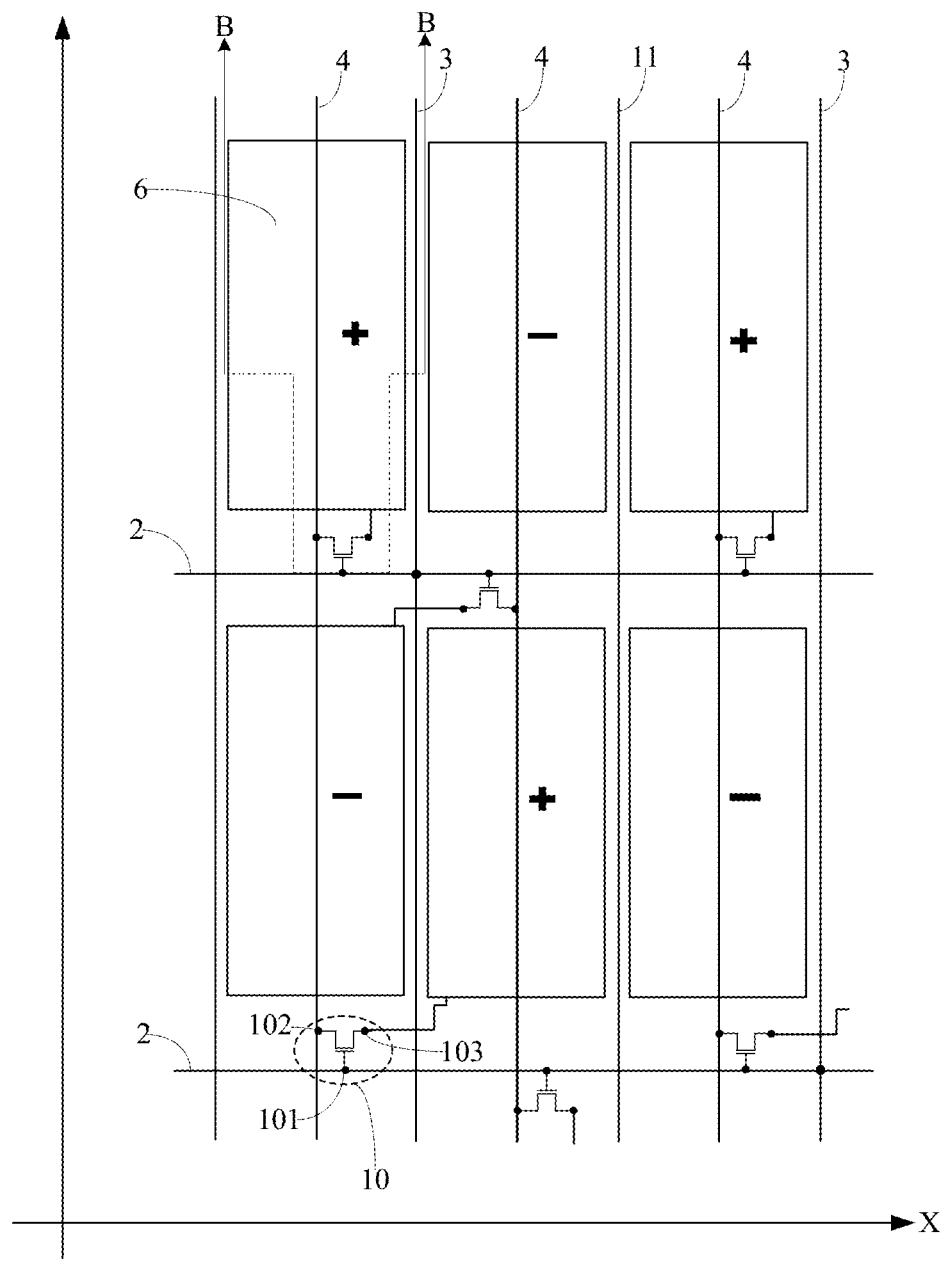
FIG. 6 is a schematic top view showing an arrangement of a pixel structure in a display substrate according to an embodiment of the present disclosure.
Figure 7:
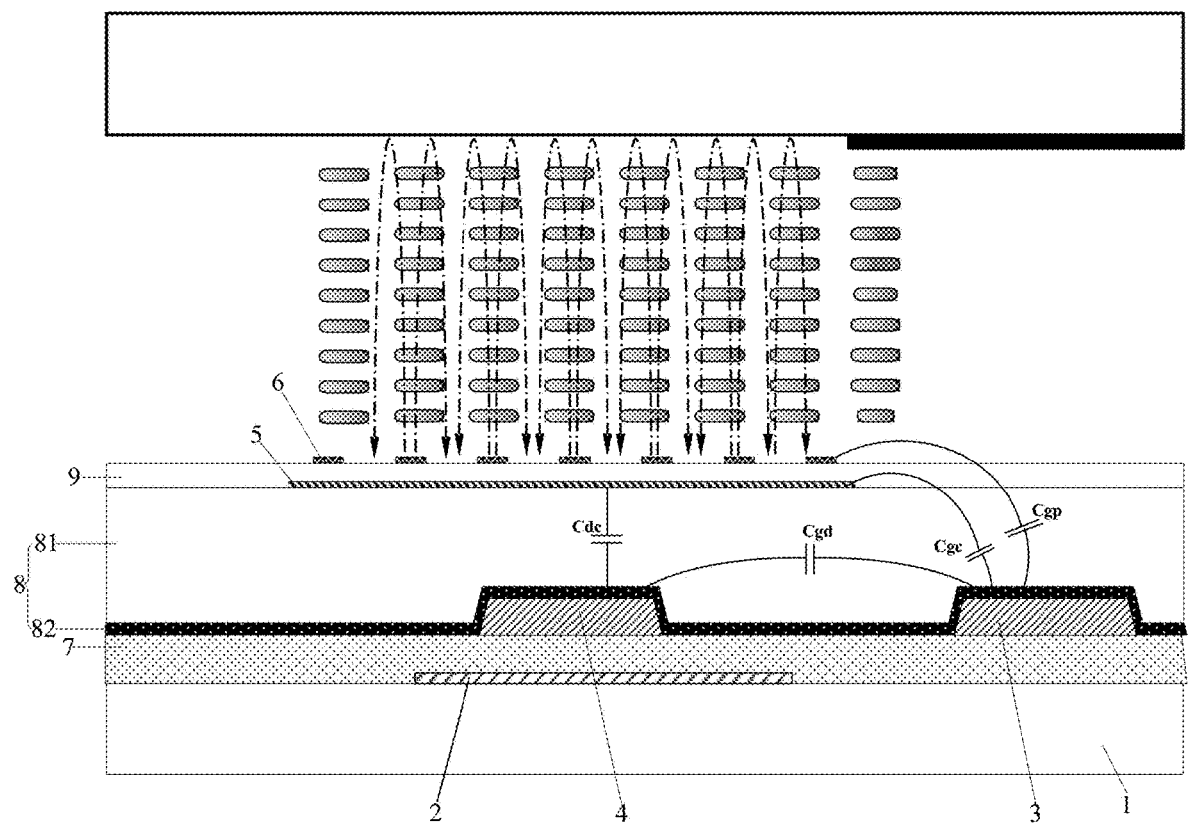
FIG. 7 is a schematic cross-sectional view showing a structure of the display substrate in FIG. 6 taken along line BB.

In an embodiment of the present disclosure, a display substrate is provided. The display substrate, as shown in FIGS. 6 and 7, includes a base substrate 1, and a plurality of first scanning lines 2, a plurality of second scanning lines 3, a plurality of data lines 4, a plurality of common electrodes 5 and a plurality of pixel electrodes 6 on the base substrate 1. The second scanning lines 3 are parallel to the data lines 4. The second scanning line 3, the common electrode 5 and the pixel electrode 6 are in different layers. The common electrode 5 is located on a side of the second scanning line 3 and the data line 4 away from the base substrate 1, and on a side of the pixel electrode 6 proximal to the base substrate 1. An orthographic projection of one of the data line 4 and the second scanning line 3 on the base substrate 1 is located in a spacer region between adjacent pixel electrodes 6, and an orthographic projection of the other of the data line 4 and the second scanning line 3 overlaps an orthographic projection of the pixel electrode 6 on the base substrate 1.

Optionally, the second scanning line 3 is disposed in the same layer as the data line 4. The first scanning line 2 is disposed on a side of the second scanning line 3 proximal to the base substrate 1, a first insulation layer 7 is provided between the second scanning line 3 and the first scanning line 2, and each second scanning line 3 is connected to a corresponding first scanning line 2 through a via formed in the first insulation layer 7 to provide an input signal for the first scanning line 2; the common electrode 5 and the pixel electrode 6 are disposed on a side of the second scanning line 3 away from the base substrate 1. The common electrode 5 and the pixel electrode 6 are sequentially arranged away from the base substrate 1 and correspond to each other respectively. A second insulation layer 8 is provided between the common electrode 5 and the second scanning line 3; and a third insulation layer 9 is provided between the common electrode 5 and the pixel electrode 6.

The second scanning line 3 provides a gate drive signal for a first scanning line 2 connected to the second scanning line 3. The gate drive signal is provided to a switch transistor 10 through the first scanning line 2 to turn on the switch transistor 10. At this time, the data signal is provided to the pixel electrode 6 through the data line 4. The common electrode 5 and the pixel electrode 6 are correspondingly stacked so that the display substrate becomes a display substrate capable of implementing an Advanced Super Dimension Switch (ADS) display mode.

The orthographic projection of one of the data line 4 and the second scanning line 3 on the base substrate 1 is located in a spacer region between adjacent pixel electrodes 6, and the orthographic projection of the other of the data line 4 and the second scanning line 3 on the base substrate 1 overlaps the orthographic projection of the pixel electrode 6 on the base substrate 1. Since the orthographic projection of the data line 4 or the second scanning line 3 on the base substrate 1 overlaps the orthographic projection of the pixel electrode 6 on the base substrate 1, that is, at least a portion of the data line 4 or the second scanning line 3 is located in the orthographic projection of the pixel electrode 6 on the base substrate 1, so that a distance between the data line 4 and the second scanning line 3 disposed in the same layer is increased as compared to the existing design in which both the data line and the vertical gate line are located in the spacer region between adjacent pixel electrodes. As a result, the parasitic capacitance Cgd between the data line 4 and the second scanning line 3 decreases significantly, the pulling effect of the gate drive signal on the data signal on the data line 4 when the gate drive signal on the second scanning line 3 jumps can be reduced, and the pulling of the gate drive signal on the pixel voltage of the pixel electrode 6 when the gate drive signal on the second scanning line 3 jumps can be reduced, and finally a difference between a pixel voltage of the pixel electrode 6 at the connection position where the second scanning line 3 is connected to the first scanning line 2 and a pixel voltage of the pixel electrode 6 at other position can be greatly decreased, thereby improving or eliminating the abnormal display (such as "V" shaped Mura) of the display screen. Meanwhile, since a common electrode 5 is provided between the data line 4 and the pixel electrode 6 and provided between the second scanning lines 3 and the pixel electrode 6, when the data line 4 is located in the middle of the pixel electrode 6, the common electrode 5 can electrically shield the data line 4 from the pixel electrode 6, so that no parasitic capacitance exists between the data line 4 and the pixel electrode 6, thereby greatly improving the defects such as crosstalk of the data lines 4 on the left and right sides on the pixel electrode 6 due to the difference in the parasitic capacitances between the pixel electrode 6 and the data lines 4 on the left and right sides. When the orthographic projection of the second scanning lines 3 on the base substrate 1 overlaps the orthographic projection of the pixel electrode 6 on the base substrate 1, the common electrode 5 can electrically shield the second scanning line 3 from the pixel electrode 6 so that substantially no parasitic capacitance exists between the second scanning line 3 and the pixel electrode 6, and thus the pulling effect of the gate drive signal on the pixel voltage of the pixel electrode 6 when the gate drive signal on the second scanning line 3 jumps can be significantly decreased or no longer occurs; and finally, a difference between a pixel voltage of the pixel electrode 6 at the connection position where the second scanning line 3 is connected to the first scanning line 2 and a pixel voltage of the pixel electrode 6 at other position can be greatly decreased, thereby improving or eliminating the abnormal display (such as "V" shaped Mura) of the display screen. Moreover, each data line 4 has a same parasitic capacitance with the left and right pixel electrode 6 thereof, that is, the data line 4 pulls the pixel voltages of the left and right pixel electrodes 6 symmetrically, so that the defect of the difference in crosstalks between the data line 4 and the left and right pixel electrodes 6 due to asymmetrical pulling effect of the data line 4 on the pixel voltages of the pixel electrodes 6 can be avoided, and the display quality of the display substrate can be improved.

In the embodiment, optionally, the orthographic projections of the data line 4 on the base substrate 1 is located on a center line of the orthographic projection of the pixel electrode 6 on the base substrate 1, and the orthographic projection of the second scanning line 3 on the base substrate 1 is located in a spacer region between adjacent pixel electrodes 6. With such arrangement, a maximum distance between a data line 4 and the second scanning lines 3 adjacent to the data line 4 can be realized, the pulling effect of the gate drive signal on the pixel voltage on the pixel electrode 6 when the gate drive signal on the second scanning line 3 jumps can be decreased, and finally, a difference between a pixel voltage of the pixel electrode 6 at the connection position where the second scanning line 3 is connected to the first scanning line 2 and a pixel voltage of the pixel electrode 6 at other position is greatly decreased, thereby improving or eliminating the abnormal display of the display screen, furthermore the defect of the difference in crosstalks between the data line 4 and the left and right pixel electrodes 6 due to asymmetrical pulling of the data line 4 on the pixel voltages of the pixel electrodes 6 can be improved, and the display quality of the display substrate can be further improved.

Optionally, the display substrate further includes a plurality of switch transistors 10 each including a gate electrode 101, the first insulation layer 7, an active layer, a source electrode 102 and a drain electrode 103. The gate electrode 101 is disposed in the same layer as the first scanning line 2, the first insulation layer 7 and the active layer are sequentially stacked on a side of the gate electrode 101 away from the base substrate 1, the source electrode 102 and the drain electrode 103 are disposed in the same layer as the data line 4 and on a side of the active layer away from the base substrate 1. The source electrode 102 and the drain electrode 103 are disposed at two opposite sides of the active layer respectively and connected to the active layer. The drain electrodes 103 of the switch transistors 10 are respectively connected to corresponding pixel electrodes 6. The source electrodes 102 of the switch transistors 10 are respectively connected to corresponding data lines 4. The gate electrodes 101 of the switch transistors 10 corresponding to rows of the pixel electrodes 6 are respectively connected to corresponding first scanning lines 2. Among columns of pixel electrodes 6, the source electrodes 102 of the switch transistors 10 in odd-numbered columns of pixel electrodes 6 are correspondingly connected to one data line 4, the source electrodes 102 of the switch transistors 10 corresponding to even-numbered columns of pixel electrodes 6 are correspondingly connected to another data line 4, and the one data line 4 is adjacent to the another data line 4. With such arrangement, a dot-inversion display mode of the display substrate can be realized. The display substrate having the above structure tends to present an abnormal display screen with "shaking stripes" during a column-inversion display mode. With the display substrate in the dot-inversion display mode, the abnormal display screen can be avoided, and the display image quality can be improved.

Optionally, switch transistors 10 connected to a same data line 4 are respectively disposed on two sides of the data line 4 or alternatively disposed on a same side of the data line 4, and disposed proximal to the data line 4. The switch transistors 10 are disposed in a spacer region where the first scanning lines 2 are located between adjacent pixel electrodes 6, and are covered by a black matrix. With such arrangement, a layout of the switch transistors 10 in the pixel structure of the display substrate tends to be consistent, no matter the data lines 4 are correspondingly located in the spacer region between adjacent pixel electrodes 6 or located on the center line of the pixel electrode 6, thereby avoiding a display image difference due to a layout difference of the switch transistors 10, and improving the quality of the display image.

Optionally, the pixel electrodes 6 are arranged in an array, the first scanning lines 2 extend in a row direction X of the array, and the first scanning line 2 is located in the spacer region between any two adjacent rows of the pixel electrodes 6. The second scanning lines 3 and the data lines 4 extend in a column direction Y of the array, that is, the second scanning lines 3 extend in a straight line direction. With such arrangement, a wiring length of the second scanning lines 3 can be shortened as compared with the existing solution in which the second scanning lines extend in a non-straight line direction, and the resistance of the second scanning line 3 can be decreased, and attenuation of the gate drive signals transmitted on the second scanning lines 3 can be decreased as well, ensuring a consistent magnitude of the gate drive signals during the transmission process, and improving the driving consistency and the display quality of the display substrate. Meanwhile, with the above arrangement of the second scanning lines 3 and the data lines 4 of the present embodiment, in the case where the second scanning lines 3 extend in the straight line direction, a consistent physical layout of the pixel structure (including the pixel electrodes 6, the switch transistors 10, the data lines 4, the first scanning lines 2 and the second scanning lines 3) in the display substrate, thereby avoiding a display image difference due to a difference in physical layout of the pixel structure in the display substrate, and improving the quality of the display image.

Optionally, the data line 4 has a width greater than the second scanning line 3. The widths of the data line 4 and the second scanning line 3 refer to sizes of the data line 4 and the second scanning line 3 in a direction perpendicular to an extending direction thereof. With such arrangement, the resistance of the data line 4 can be significantly decreased, and the loss of data signal on the data line 4 during the transmission process can be decreased, thereby improving the quality of the display image. In addition, since the data line 4 is disposed on the center line of the orthographic projection of the pixel electrode 6 on the base substrate 1, a wider data line 4 still has a sufficient space to be installed, and meanwhile, since the data line 4 is disposed on the center line of the orthographic projection of the pixel electrode 6 on the base substrate 1, a maximum distance between the data line 4 and the second scanning line 3 can be ensured. As a result, the parasitic capacitance Cgd between the data line 4 and the second scanning line 3 can be decreased significantly, and the pulling, by the gate drive signal, the data signal on the data line 4 when the gate drive signal on the second scanning line 3 jumps can be improved, and the pulling, by the gate drive signal, the pixel voltage on the pixel electrode 6 when the gate drive signal on the second scanning line 3 jumps can be improved, and finally a difference between a pixel voltage of the pixel electrode 6 at the connection positon where the second scanning line 3 is connected to the first scanning line 2 and a pixel voltage of the pixel electrode 6 at other position can be decreased, thereby improving or eliminating the abnormal display of the display screen.

Optionally, the second scanning line 3 has the same thickness as the data line 4; and the second insulation layer 8 includes a first sub-layer 81 with a thickness greater than the data line 4, and a thickness ratio of the first sub-layer 81 to the data line 4 ranges from 3:1 to 9:1. The first sub-layer 81 has a thickness in the range of 2.0 to 2.5 μm. The data line 4 has a thickness in the range of 3000 Å to 7000 Å. The first sub-layer 81 is made of a transparent organic resin material. On one hand, the transparent organic resin material allows the light to transmit therethrough, so that the region of the pixel electrodes 6 is light transmissive; and on the other hand, the resin material may form a thicker first sub-layer 81.

Optionally, the second insulation layer 8 further includes a second sub-layer 82. The second sub-layer 82 and the first sub-layer 81 are stacked sequentially away from the base substrate 1. The first sub-layer 81 has a thickness greater than the second sub-layer 82, and a thickness ratio of the second sub-layer 82 to the first sub-layer 81 ranges from 1:25 to 1:10. The second sub-layer 82 has a thickness in the range of 1000 Å to 2000 Å. The second sub-layer 82 is made of silicon nitride or silicon oxide. The second sub-layer 82 functions as a buffer layer, and the first sub-layer 81 is formed on the second sub-layer 82, so that the first sub-layer 81 made of the organic resin material is firmly formed on the data line 4 and the second scanning line 3, and the first sub-layer 81 cannot be separated easily from the data line 4 and the second scanning line 3.

In the embodiment, based on the above arrangement of the first sub-layer 81 and the second sub-layer 82 in the second insulation layer 8, since the first sub-layer 81 is thicker, the parasitic capacitance Cgp between the second scanning line 3 and the pixel electrode 6, the parasitic capacitance Cdp between the data line 4 and the pixel electrode 6, and the parasitic capacitance Cgd between the second scanning line 3 and the data line 4 can be all greatly decreased. Meanwhile, since an organic resin material has a dielectric constant smaller than that of an inorganic insulating material (such as silicon nitride, silicon oxide, and the like), the parasitic capacitance Cgp between the second scanning line 3 and the pixel electrode 6, the parasitic capacitance Cdp between the data line 4 and the pixel electrode 6, and the parasitic capacitance Cgd between the second scanning line 3 and the data line 4 can be further decreased, so that the pulling of the gate drive signal on the data signal on the data line 4 as well as the pulling of the gate drive signal on the pixel voltage of the pixel electrode 6 due to the relatively large parasitic capacitances described above when the gate drive signal on the second scanning line 3 jumps can be reduced significantly, and finally, a difference between a pixel voltage of the pixel electrode 6 at the connection position where the second scanning line 3 is connected to the first scanning line 2 and a pixel voltage of the pixel electrode 6 at other position can be greatly reduced, thereby improving or eliminating the abnormal display of the display screen.

Optionally, the third insulation layer 9 has a thickness in the range of 3000 Å to 5000 Å. The third insulation layer 9 is made of silicon nitride or silicon oxide. Compared with an overall thickness of the insulation layer between the common electrode and the pixel electrode in the existing art, the thickness of the third insulation layer 9 disposed between the common electrode 5 and the pixel electrode 6 in the embodiment is greatly decreased, which significantly increases the capacitance Cst between the common electrode 5 and the pixel electrode 6, and a retention capability of the pixel voltage increases. Since the capacitance Cst between the common electrode 5 and the pixel electrode 6 is much greater than each of the parasitic capacitance Cgp between the second scanning line 3 and the pixel electrode 6 and the parasitic capacitance Cdp between the data line 4 and the pixel electrode 6, by setting the thickness of the third insulation layer 9 as above, the pulling of the gate drive signal on the data signal on the data line 4 when the gate drive signal on the second scanning line 3 jumps can be improved, and the pulling of the gate drive signal on the pixel voltage of the pixel electrode 6 when the gate drive signal on the second scanning line 3 jumps can be improved, and thus a difference between a pixel voltage of the pixel electrode 6 at the connection position where the second scanning line 3 is connected to the first scanning line 2 and a pixel voltage of the pixel electrode 6 at other position can be greatly reduced, thereby improving or eliminating the abnormal display of the display screen.

Optionally, the common electrodes 5 are plane electrode blocks, and the pixel electrodes 6 are slit electrodes. With such arrangement, the display in the Advanced Super Dimension Switch (ADS) display mode of the display substrate can be better implemented, and thus wide-viewing-angle display of the display substrate can be better realized.

Optionally, the number of the second scanning lines 3 is smaller than the number of the data lines 4. The display substrate further includes a plurality of common electrode lines 11 on the base substrate 1, where the common electrode lines 11 and the second scanning lines 3 are disposed in a same layer and parallel to each other. An orthographic projection of the common electrode line 11 on the base substrate 1 is located in a spacer region between some adjacent pixel electrodes 6. The second scanning line 3 is not provided in the spacer region between the some adjacent pixel electrodes 6. The number of the second scanning lines 3 is smaller than the number of the data lines 4, since the second scanning line 3 is not provided in the spacer region between some adjacent pixel electrodes 6. By forming the common electrode line 11 in the spacer region where no second scanning line 3 is formed between adjacent pixel electrodes 6, layouts of signal lines in the spacer regions between adjacent pixel electrodes 6 tend to be consistent, and a physical layout of the pixel structure (including the pixel electrodes 6, the switch transistors 10, the data lines 4, the first scanning lines 2, the second scanning lines 3 and the common electrode lines 11) in the display substrate tends to be consistent, thereby avoiding a display image difference of the display substrate due to a difference in physical layout of the pixel structure, and improving the quality of the display image.

Optionally, the second scanning lines 3 and the common electrode lines 11 are alternately arranged in sequence along an arrangement direction of the data lines 4, and the spacing between any adjacent second scanning line 3 and the common electrode line 11 is equal. With such arrangement, a consistent layout of signal lines in the spacer regions between adjacent pixel electrodes 6 can be ensured, so that a physical layout of the pixel structure (including the pixel electrodes 6, the switch transistors 10, the data lines 4, the first scanning lines 2, the second scanning lines 3 and the common electrode lines 11) in the display substrate further tends to be consistent, thereby avoiding a display image difference due to a difference in the physical layout of the pixel structure in the display substrate, and improving the quality of the display image.

Optionally, the number of the second scanning lines 3 is n times the number of the first scanning lines 2, where n is an integer, and n=1, 2, 3 . . . . When the number of the second scanning lines 3 is 1 time of the number of the first scanning lines 2, the second scanning lines 3 are connected to the first scanning lines 2 in one-to-one correspondence to input the gate drive signals to the first scanning lines 2. When the number of the second scanning lines 3 is 2 times of the number of the first scanning lines 2, every two second scanning lines 3 are correspondingly connected to one of the first scanning lines 2, so that the second scanning lines 3 doubly drive the first scanning lines 2. That is, two second scanning lines 3 input a same gate drive signal at two position points of one first scanning line 2, respectively, so as to improve or avoid a magnitude difference of the gate drive signal on the first scanning line 2 during the transmission process, thereby improving or avoiding a display image difference due to the size difference of the gate drive signal during the transmission process, and improving the quality of the display image. When the number of the second scanning lines 3 is more than 3 times of the number of the first scanning lines 2, the display image difference due to the size difference of the gate drive signal during the transmission process can be further improved or avoided, and the quality of the display image can be further improved. The improvement principle is the same as the above and thus will not be repeated herein.

Optionally, adjacent second scanning lines 3 are evenly spaced apart from each other in equal intervals, and connection points each at which the second scanning line 3 is connected to the first scanning line 2 are arranged to form a straight line or a polygonal line. When the number of the second scanning lines 3 is 1 time of the number of the first scanning lines 2, connections points each at which the second scanning line 3 is connected to the first scanning line 2 are arranged to form a straight line. When the number of the second scanning lines 3 is more than 2 times of the number of the first scanning lines 2, connections points each at which the second scanning line 3 is connected to the first scanning line 2 are arranged to form a polygonal line. No matter connection points each at which the second scanning line 3 is connected to the first scanning line 2 are arranged to form a straight line or a polygonal line, the difference between the pixel voltage of the pixel electrode 6 at the connection point where the second scanning line 3 is connected to the first scanning line 2 and the pixel voltage of pixel electrodes 6 at other position is small (substantially neglectable), thereby improving or eliminating the abnormal display (such as "V" shaped Mura) of the display screen at a position of the straight line or polygonal line.

Based on the above structure of the display substrate, a method for manufacturing a display substrate is provided in an embodiment. The method includes forming a plurality of first scanning lines, a plurality of second scanning lines, a plurality of data lines, a plurality of common electrodes and a plurality of pixel electrodes on the base substrate. The second scanning lines are parallel to the data lines, and the second scanning line, the common electrode and the pixel electrode are in different layers. The common electrodes are located on a side of the second scanning lines and the data lines away from the base substrate, and on a side of the pixel electrodes proximal to the base substrate. An orthographic projection of one of the data line and the second scanning line on the base substrate is located in a spacer region between adjacent pixel electrodes, and an orthographic projection of the other of the data line and the second scanning line on the base substrate overlaps an orthographic projection of the pixel electrode on the base substrate.

The method for manufacturing a display substrate in the embodiment specifically includes: sequentially forming first scanning lines, a first insulation layer, second scanning lines and data lines, a second insulation layer, common electrodes, a third insulation layer, and pixel electrodes on the base substrate. The second scanning lines and the data lines are formed simultaneously through a same process, and the second scanning line is connected to a corresponding first scanning line through a via formed in the first insulation layer to provide an input signal for the first scanning line. The common electrodes correspond to the pixel electrodes, respectively.

Optionally, the method for manufacturing a display substrate further includes forming a plurality of common electrode lines. The common electrode lines and the second scanning lines are formed simultaneously through a same process, and parallel to each other. An orthographic projection of the common electrode line on the base substrate are located in a spacer region where no second scanning line is formed between adjacent pixel electrodes.

Optionally, the method for manufacturing a display substrate further includes forming a plurality of switch transistors. The formation of the switch transistor includes forming a gate electrode, a first insulation layer, an active layer, a source electrode and a drain electrode sequentially on the base substrate. The gate electrode and the first scanning line are simultaneously formed through a same process, and the source electrode and the drain electrode, and the data line are simultaneously formed through a same process, and the source electrode and the drain electrode are respectively disposed at two opposite sides of the active layer and connected to the active layer.

In the embodiment, the specific process for manufacturing the display substrate includes:

1) Sputtering a metal layer, performing a an exposure process, a development process and an etching process on the metal layer to form first scanning line and the gate electrode of the switch transistor; where the first scanning line has a thickness in the range of 3000 Å to 7000 Å;

2) Forming a SiNx layer through a chemical vapor deposition process to form a first insulation layer, i.e., a gate insulation layer; where the first insulation layer has a thickness in the range of 4000 Å to 5000 Å;

3) Performing a chemical vapor deposition process, an exposure process, a developing process and an etching process on a semiconductor layer to form an active layer of the switch transistor; where the active layer has a thickness of 3000 Å;

4) Sputtering a metal layer, and performing an exposing process, a development process and an etching process on the metal layer to form the data line, the second scanning line, the common electrode line, and the source electrode and the drain electrode of the switch transistor; where each of the data line, the second scanning line and the common electrode line has a thickness in the range of 3000 Å to 7000 Å;

5) Forming a SiNx layer through chemical vapor deposition to form a second sub-layer of the second insulation layer, i.e., an organic film buffer layer; where the second sub-layer has a thickness in the range of 1000 Å to 2000 Å;

6) Forming a first sub-layer of the second insulation layer, i.e., a transparent organic resin material layer through coating, exposure and development processes; where the first sub-layer has a thickness in the range of 2.0 um to 2.5 um;

7) Sputtering a first ITO metal layer, and performing an exposure process, development process and an etching process on the first ITO metal layer to form the common electrode with a thickness in the range of 300 Å to 700 Å;

8) Forming a SiNx layer through chemical vapor deposition to form a third insulation layer with a thickness in the range of 3000 Å to 5000 Å; and 9) Sputtering a second ITO metal layer, and performing an exposure process, a development process and an etching process on the second ITO metal layer to form the pixel electrode with a thickness in the range of 300 Å to 700 Å.

The specific manufacture processes of the film layers in the display substrate are conventional processes, and thus will not be described in detail here.

Figure 8:
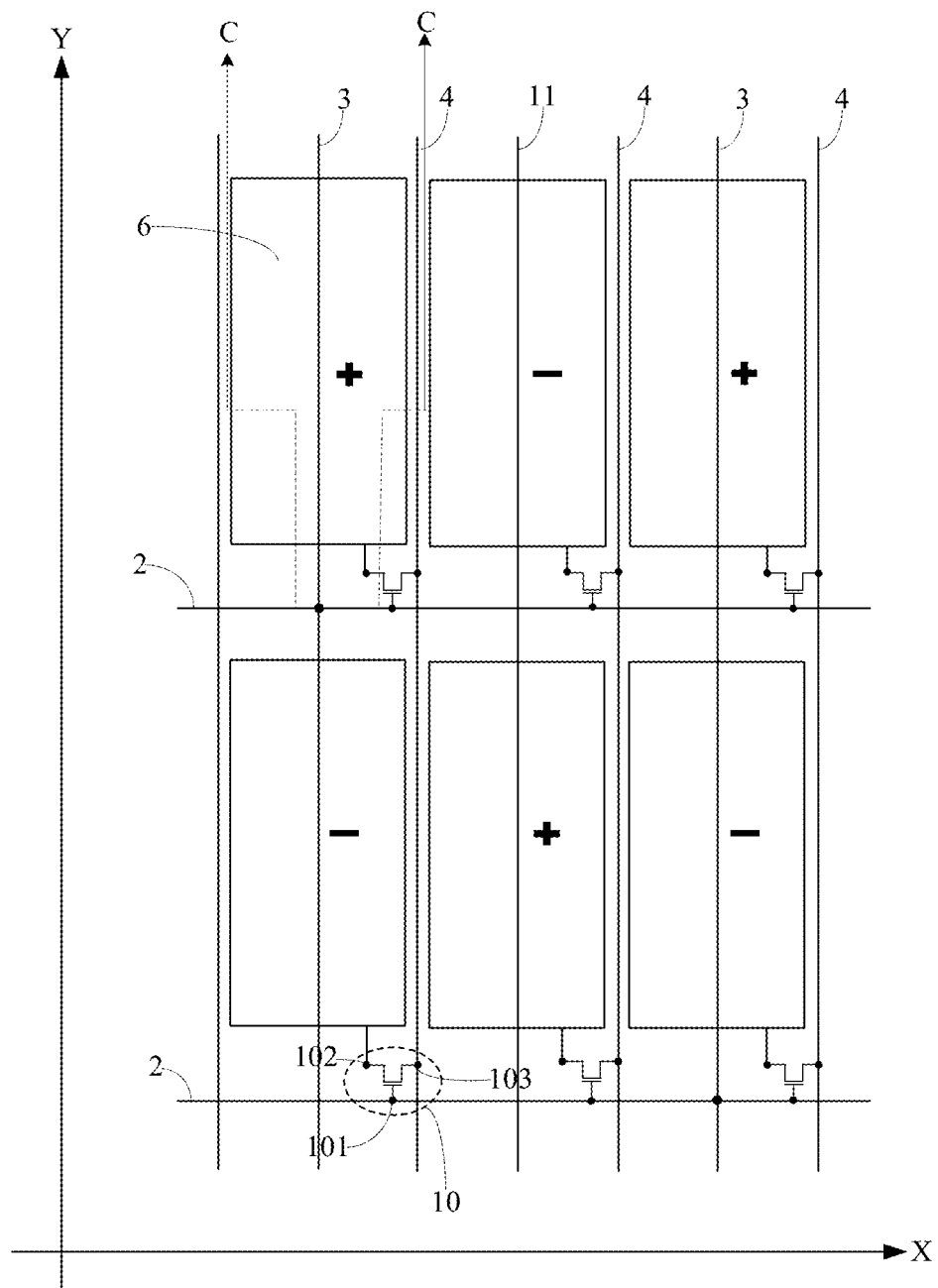
FIG. 8 is a schematic top view showing an arrangement of another pixel structure in a display substrate according to an embodiment of the present disclosure.
Figure 9:
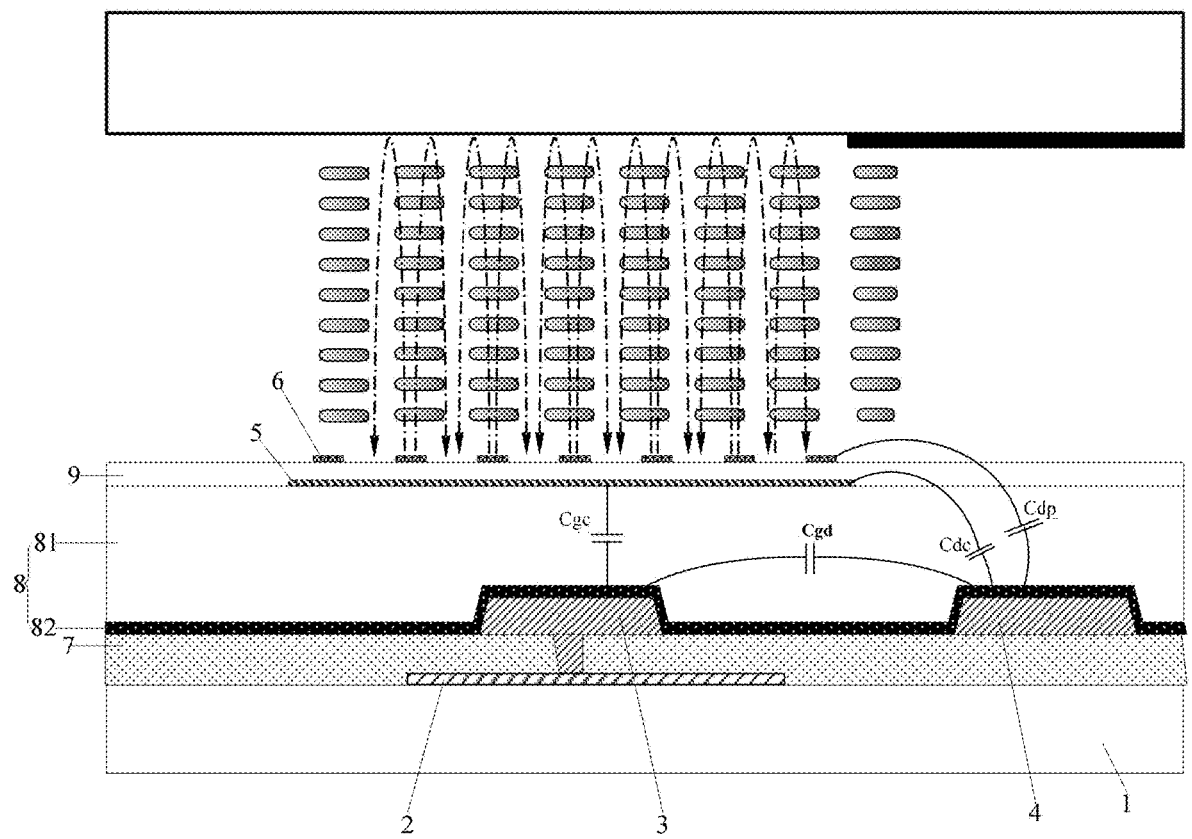
FIG. 9 is a schematic cross-sectional view showing a structure of the display substrate in FIG. 8 taken along line CC.

An embodiment of the present disclosure further provides a display substrate which differs from the above embodiment in that, as shown in FIGS. 8 and 9, an orthographic projection of the data line 4 on the base substrate 1 is located in a spacer region between adjacent pixel electrodes 6, and an orthographic projection of the second scanning line 3 on the base substrate 1 is located on a center line of an orthographic projection of the pixel electrode 6 on the base substrate 1. With such arrangement, a maximum distance between a data line 4 and a second scanning lines 3 adjacent to the data line 4 can be ensured, not only the pulling of the gate drive signal on the pixel voltage of the pixel electrode 6 when the gate drive signal on the second scanning line 3 jumps can be reduced, and finally, a difference between a pixel voltage of the pixel electrode 6 at connection positon where the second scanning line 3 is connected to the first scanning line 2 and a pixel voltage of the pixel electrode 6 at other position can be greatly reduced, thereby improving or eliminating the abnormal display of the display screen, but also the defect of crosstalk difference between the data line 4 and the left and right pixel electrodes 6 due to asymmetrical pulling of the data line 4 on the pixel voltages of the pixel electrodes 6 can be improved, and the display quality of the display substrate can be further improved.

Optionally, the second scanning line 3 has a width greater than the data line 4. The widths of the data line 4 and the second scanning line 3 refer to sizes of the data line 4 and the second scanning line 3 in directions perpendicular to the extending directions of the data line 4 and the second scanning line 3. With such arrangement, resistance of the second scanning line 3 can be greatly reduced, thereby reducing the loss of gate drive signal on the second scanning line 3 in the transmission process, and improving the quality of the display image. In addition, since the second scanning line 3 is disposed on the center line of the orthographic projection of the pixel electrode 6 on the base substrate 1, the wider second scanning line 3 has a sufficient space to be installed, and meanwhile, since the second scanning line 3 is disposed on the center line of the orthographic projection of the pixel electrode 6 on the base substrate 1, a maximum distance between the data line 4 and the second scanning line 3 can be ensured. As a result, the parasitic capacitance Cgd between the data line 4 and the second scanning line 3 can be significantly reduced, thereby the pulling, by the gate drive signal, the data signal on the data line 4 when the gate drive signal on the second scanning line 3 is turned off can be significantly reduced, and the pulling, by the gate drive signal, the pixel voltage on the pixel electrode 6 when the gate drive signal on the second scanning line 3 are turned off can be significantly reduced, and finally, a difference between a pixel voltage of the pixel electrode 6 at the connection where the second scanning line 3 is connected to the first scanning line 2 and a pixel voltage of the pixel electrode 6 at other position can be significantly reduced, thereby improving or eliminating the abnormal display of the display screen.

Optionally, the number of the second scanning lines 3 is smaller than the number of the data lines 4. The display substrate further includes a plurality of common electrode lines 11 on the base substrate 1, where the common electrode lines 11 and the second scanning lines 3 are disposed in a same layer and parallel to each other. An orthographic projection of the common electrode line 11 on the base substrate 1 overlaps orthographic projections of a part of pixel electrodes 6 on the base substrate 1; and the orthographic projections of the part of some pixel electrodes 6 on the base substrate 1 do not overlap an orthographic projection of the second scanning line 3 on the base substrate 1.

Since the number of the second scanning lines 3 is smaller than the number of the data lines 4, the orthographic projections of the some pixel electrodes 6 on the base substrate 1 do not overlap the orthographic projection of the second scanning line 3 on the base substrate 1. The orthographic projection of the common electrode line 11 on the base substrate 1 overlaps the orthographic projections of the some the pixel electrodes 6 on the base substrate 1, so that layouts of signal lines in the regions of the orthographic projections of the pixel electrodes 6 on the base substrate 1 tend to be consistent, and a physical layout of the pixel structure (including the pixel electrodes 6, the switch transistors 10, the data lines 4, the first scanning lines 2, the second scanning lines 3 and the common electrode lines 11) in the display substrate tends to be consistent, thereby avoiding a display image difference of the display substrate due to a difference in physical layout of the pixel structure, and improving the quality of the display image.

Other structures of the display substrate in the embodiment are the same as those in the above embodiments, and thus will not be repeated here.

Based on the above structure of the display substrate, an embodiment further provides a method for manufacturing the display substrate, which is the same as the method for manufacturing a display substrate in the above embodiments, and thus will not be repeated here.

In the display substrate provided in the above embodiments of the present disclosure, an orthographic projection of one of the data line and the second scanning line on the base substrate is located in a spacer region between adjacent pixel electrodes, and an orthographic projection of the other of the data line and the second scanning line on the base substrate overlaps an orthographic projection of the pixel electrode on the base substrate. Since the orthographic projection of the data line or the second scanning line on the base substrate overlaps an orthographic projection of the pixel electrode on the base substrate, that is, at least a portion of the data line or the second scanning line is located in a region of the orthographic projection of the pixel electrode on the base substrate, a distance between the data line and the second scanning line disposed in the same layer is increased as compared to the existing design in which both the data line and the vertical gate line are located in the spacer region between adjacent pixel electrodes. As a result, the parasitic capacitance between the data line and the second scanning line can be greatly reduced, the pulling of the gate drive signal on the data signal on the data line when the gate drive signal on the second scanning line jumps, and the pulling of the gate drive signal on the pixel voltage of the pixel electrode when the gate drive signal on the second scanning line jumps, and finally, a difference between a pixel voltage of a pixel electrode at connection where the second scanning line is connected to the first scanning line and a pixel voltage of the pixel electrode at other position can be greatly reduced, thereby improving or eliminating the abnormal display (such as "V" shaped Mura) of the display screen. Meanwhile, since the common electrode is provided between the data line and the pixel electrode and between the second scanning lines and the pixel electrode. When the data line is located in the middle of the pixel electrode, the common electrode can electrically shield the data line apart from the pixel electrode, so that no parasitic capacitance exists between the data line and the pixel electrode, thereby greatly improving the defect of crosstalk difference of the left and right data lines on the pixel electrode due to difference in parasitic capacitance between the left and right data lines and the pixel electrode. When the orthographic projection of the second scanning line on the base substrate overlaps the orthographic projection of the pixel electrode on the base substrate, the common electrode can shield the second scanning line apart from the pixel electrode, so that substantially no parasitic capacitance exists between the second scanning line and the pixel electrode, and thus the pulling of the gate drive signal on the pixel voltage on the pixel electrode when the gate drive signal on the second scanning line is turned off can be greatly reduced or no longer occurs; and finally, a difference between a pixel voltage of the pixel electrode at connection where the second scanning line is connected to the first scanning line and a pixel voltage of the pixel electrode at other position can be greatly reduced, thereby improving or eliminating the abnormal display (such as "V" shaped Mura) of the display screen. Moreover, since the parasitic capacitance between the data line and the left pixel electrode is equal to the parasitic capacitance between the data line and right pixel electrode, that is, the data line pulls the pixel voltages of the left and right pixel electrodes symmetrically, so that the defect of crosstalk difference between the data line and the left and right pixel electrodes due to asymmetrical pulling of the data line on the pixel voltages of the pixel electrodes can be avoided, and the display quality of the display substrate can be improved.

An embodiment of the present disclosure further provides a display panel, including a display substrate of any of the above embodiments, and further including an counter substrate opposite to the display substrate and facing the pixel electrodes in the display substrate. Liquid crystals are filled in the gap formed when the counter substrate is aligned with the display substrate for forming a cell.

The display panel in the embodiment is a liquid crystal display panel, which can implement an Advanced Super Dimension Switch (ADS) display mode by adopting the display substrate in the above embodiments.

In the display panel including the display substrate in the above embodiments, the pixel voltages of the pixel electrodes at different positions in the display panel tend to be consistent, and the defect of crosstalk difference between the data line and the left and right pixel electrodes in the display panel due to asymmetrical pulling of the data line on the pixel voltages of the pixel electrodes can be avoided, thereby improving the quality of the display image as well as the display effect of the display panel.

The display panel in the embodiments of the present disclosure may be any product or component with a display function, such as an LCD panel, an LCD television, a monitor, a mobile phone, a navigator, or the like.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A display substrate, comprising a base substrate, and a first scanning line, a second scanning line, a data line, a common electrode and a plurality of pixel electrodes on the base substrate; wherein the second scanning line is parallel to the data line, and the second scanning line, the common electrode and the plurality of pixel electrodes are in different layers; and the common electrode is located on a side of the second scanning line and the data line away from the base substrate, and on a side of the plurality of pixel electrodes proximal to the base substrate; and an orthographic projection of one of the data line and the second scanning line on the base substrate is located in a spacer region between adjacent pixel electrodes of the plurality of pixel electrodes, and an orthographic projection of the other of the data line and the second scanning line on the base substrate overlaps orthographic projections of a part of pixel electrodes of the plurality of pixel electrodes on the base substrate.

2. The display substrate according to claim 1, wherein the orthographic projection of the data line on the base substrate is located on a center line of the orthographic projections of the part of pixel electrodes on the base substrate, and the orthographic projection of the second scanning line on the base substrate is located in the spacer region between the adjacent pixel electrodes.

3. The display substrate according to claim 1, wherein the second scanning line is disposed in the same layer as the data line; the first scanning line is disposed on a side of the second scanning line proximal to the base substrate, a first insulation layer is provided between the second scanning line and the first scanning line, and the second scanning line is connected to the first scanning lines through a via formed in the first insulation layer to provide an input signal for the first scanning line;

the common electrode and the plurality of pixel electrodes are disposed on a side of the second scanning line away from the base substrate, and the common electrode and the plurality of pixel electrodes are sequentially arranged away from the base substrate and correspond to each other; a second insulation layer is provided between the common electrode and the second scanning line; and a third insulation layer is provided between the common electrode and the plurality of pixel electrodes.

4. The display substrate according to claim 3, comprising a plurality of first scanning lines wherein the plurality of pixel electrodes are arranged in an array, the plurality of first scanning lines extend in a row direction of the array, and a spacer region between any two adjacent rows of pixel electrodes is provided with one of the plurality of first scanning lines.

5. The display substrate according to claim 1, wherein one of the data line and the second scanning line with the orthographic projection thereof on the base substrate overlapping the orthographic projections of the part of pixel electrodes on the base substrate has a width greater than a width of the other of the data line and the second scanning line with the orthographic projection thereof on the base substrate located in the spacer region between the adjacent pixel electrodes.

6. The display substrate according to claim 1, wherein the second scanning line has the same thickness as the data line; and the second insulation layer comprises a first sub-layer with a thickness greater than a thickness of the data line, and a thickness ratio of the first sub-layer to the data line ranges from 3: 1 to 9:1.

7. The display substrate according to claim 6, wherein the second insulation layer further comprises a second sub-layer, the second sub-layer and the first sub-layer being stacked sequentially away from the base substrate; and the first sub-layer has a thickness greater than a thickness of the second sub-layer, and a thickness ratio of the second sub-layer to the first sub-layer ranges from 1:25 to 1:10.

8. The display substrate according to claim 4, comprising a plurality of data lines and a plurality of second scanning lines wherein the plurality of data lines and the plurality of second scanning lines extend in a column direction, a number of the plurality of second scanning lines is smaller than a number of the plurality of data lines;

the display substrate further comprises a plurality of common electrode lines on the base substrate, wherein the plurality of common electrode lines and the plurality of second scanning lines are disposed in a same layer and parallel to each other;

the orthographic projections of the plurality of data lines on the base substrate overlap the orthographic projections of the part of pixel electrodes on the base substrate, orthographic projections of the plurality of common electrode lines on the base substrate are respectively located in spacer regions between adjacent pixel electrodes of the plurality of pixel electrodes, and no second scanning line is provided in the spacer regions between the adjacent pixel electrodes.

9. The display substrate according to claim 8, wherein the plurality of second scanning lines and the plurality of common electrode lines are alternately arranged along an arrangement direction of the plurality data lines, and any two adjacent second scanning line and the common electrode line has a same distance therebetween.

10. The display substrate according to claim 8, further comprising a plurality of switch transistors each comprising a gate electrode, the first insulation layer, an active layer, a source electrode and a drain electrode; wherein the gate electrode is disposed in the same layer as the first scanning lines, the first insulation layer and the active layer are sequentially stacked on a side of the gate electrode away from the base substrate, the source electrode and the drain electrode are disposed in the same layer as the data lines and on a side of the active layer away from the base substrate, and the source electrode and the drain electrode are disposed at two opposite sides of the active layer respectively and connected to the active layer;

the drain electrodes of the switch transistors are respectively connected to corresponding pixel electrodes; the source electrodes of the switch transistors are respectively connected to corresponding data lines; and the gate electrodes of the switch transistors corresponding to rows of pixel electrodes are respectively connected to corresponding first scanning lines; and among columns of pixel electrodes, the source electrodes of the switch transistors corresponding to odd-numbered columns of pixel electrodes are correspondingly connected to one of the data lines, the source electrodes of the switch transistors corresponding to even-numbered columns of pixel electrodes are correspondingly connected to another one of the data lines, with the one data line being adjacent to the another data line.

11. The display substrate according to claim 10, wherein the switch transistors connected to a same data line are respectively disposed at two sides or a same side of the data line, and disposed proximal to the data line.

12. The display substrate according to claim 8, wherein a number of the plurality of second scanning lines is n times a number of the plurality of first scanning lines, where n is an integer, and n=1, 2, 3 . . .

13. The display substrate according to claim 12, wherein adjacent second scanning lines has a same distance therebetween, and points at connection positons where the plurality of second scanning lines are respectively connected to the plurality of first scanning lines are arranged to form a straight line or a polygonal line.

14. A display panel, comprising the display substrate according to claim 1, and further comprising an counter substrate opposite to the display substrate and facing the plurality of pixel electrodes in the display substrate; wherein liquid crystals are filled in a gap formed by aligning the counter substrate and the display substrate for forming a cell.

15. The display substrate according to claim 1, wherein
the orthographic projection of the data line on the base substrate is located in the spacer region between the adjacent pixel electrodes, and the orthographic projection of the second scanning line on the base substrate is located on a center line of the orthographic projections of the part of pixel electrodes on the base substrate.

16. The display substrate according to claim 4, comprising a plurality of data lines and a plurality of second scanning lines wherein
the plurality of data lines and the plurality of second scanning lines extend in a column direction,
a number of the plurality of second scanning lines is smaller than a number of the plurality of data lines;
the display substrate further comprises a plurality of common electrode lines on the base substrate, wherein the plurality of common electrode lines and the plurality of second scanning lines are disposed in a same layer and parallel to each other;
the orthographic projections of the plurality of data lines on the base substrate are respectively located in the spacer regions between the adjacent pixel electrodes, orthographic projections of the plurality of common electrode lines on the base substrate overlap orthographic projections of a part of adjacent pixel electrodes of the plurality of pixel electrodes on the base substrate, and the orthographic projections of the part of adjacent pixel electrodes on the base substrate do not overlap the orthographic projections of the plurality of second scanning lines on the base substrate.

* * * * *